Nov. 28, 1950   W. J. O'BRIEN   2,531,918
RADIO DIRECTION INDICATING DEVICE
Filed Jan. 20, 1947   2 Sheets-Sheet 1
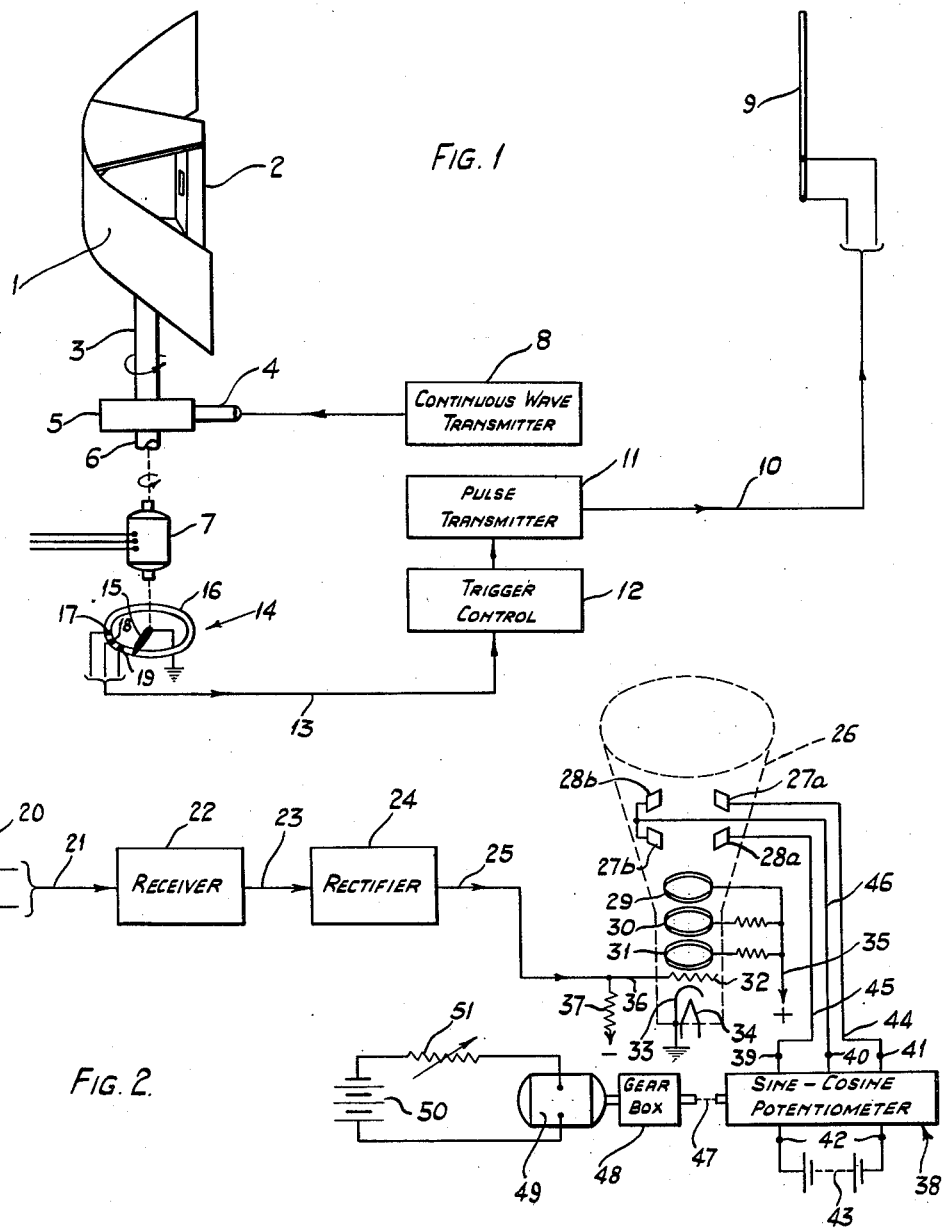
INVENTOR.
William J. O'Brien Nov. 28, 1950 W. J. O'BRIEN 2,531,918
RADIO DIRECTION INDICATING DEVICE
Filed Jan. 20, 1947 2 Sheets-Sheet 2

INVENTOR.
William J. O'Brien

Patented Nov. 28, 1950

2,531,918

UNITED STATES PATENT OFFICE 2,531,918

RADIO DIRECTION INDICATING DEVICE

William J. O'Brien, London, England, assignor to The Decca Record Company, Limited, London, England, a corporation of Great Britain Application January 20, 1947, Serial No. 723,177
In Great Britain January 31, 1946

3 Claims. (Cl. 343—106)

This invention relates to radio direction indicating devices and has particular reference to radio frequency transmitting and mobile receiving apparatus operating to continuously indicate at the receiving apparatus the bearing of the transmitting apparatus.

In the navigation of mobile vehicles such as surface ships and aircraft there is a need for an inexpensive lightweight mobile apparatus which will continuously indicate to the driver of the vehicle the bearing of a landmark of known geographical location. Many radio direction indicating devices have been devised prior to this invention in an attempt to supply this need but all of the prior devices have been characterised by certain outstanding disadvantages.

The aforementioned prior devices may be divided into two general classes; the first being those which produce a rotating cardioid or figure-of-eight pattern with the transmission interrupted momentarily at a known orientation of the pattern, the bearing being obtained at the receiver by measuring the time lapse between the reception of the null of the rotating pattern and the momentary interruption of transmission; and the second being those providing a rotating pattern and a non-directional pattern of slightly different frequencies, one of the transmissions being modulated at a frequency equal to the difference between the two transmission frequencies, and the bearing being obtained at the receiver by measuring the phase angle between the modulation signal and the beat frequency derived from the two radio frequencies.

The first of the above mentioned classes of devices has the disadvantage of operating at the null point in the reception of the directional pattern. This is necessary because the maximum of the pattern embraces such a wide angular scope that it is impossible to obtain an accurate bearing using the time of reception of maximum signal. However, in operating at the null point it is necessary to base the time measurement upon the reception of signals of very low intensity, with the result that both sensitivity and accuracy of the system are very poor. Furthermore, the timing of the period between the two characteristic points in the received transmission is difficult to effect with the required accuracy.

The second of the above described general classes of device has the outstanding disadvantage of requiring heavier and more expensive equipment at the receiver end, the difficulty of maintaining the required phase regulation at the transmitter, the difficulty of measuring at the receiver the phase angle with the accuracy required to give a reasonably accurate bearing indication, and the difficulties attendant upon interfering signals and static arising out of the use of a modulated signal.

The present invention is directed to a radio direction indicating device intended to overcome the above noted disadvantages, and it is therefore an object of this invention to provide a device of the character referred to which is simple, inexpensive, and reliable in operation.

It is also an object of this invention to provide a radio direction indicating device which includes transmitting apparatus for establishing a rotating unidirectional beam of radio frequency energy, together with means for radiating omni-directional pulses of short duration bearing a known relation in time to the orientation of the rotating beam.

It is an additional object of this invention to provide a radio direction indicating device which includes a mobile receiving apparatus for receiving the two transmissions and indicating the bearing of the transmitting apparatus by measuring the time lapse between the reception of the two transmissions.

It is also an object of this invention to provide a device of the character above described in which the receiving apparatus includes means for directly displaying on a compass card the bearing derived from the above mentioned time measurement.

It is an additional object of this invention to provide a receiving apparatus of the character above described which includes a cathode ray tube for effecting the time measurement and compass card display of the bearing.

It is a still further object of this invention to provide a device of the character hereinbefore described in which the transmitting apparatus includes an identifying means for distinguishing at the receiver the directional transmission from the non-directional transmission.

Other objects and advantages of this invention will appear from a study of the following specification read in connection with the accompanying drawings, wherein:

Fig. 1 is a diagram illustrating one form of transmitting apparatus;

Fig. 2 is a diagram illustrating a form of receiving apparatus for receiving the signals transmitted from the apparatus shown in Fig. 1;

Figure 3:
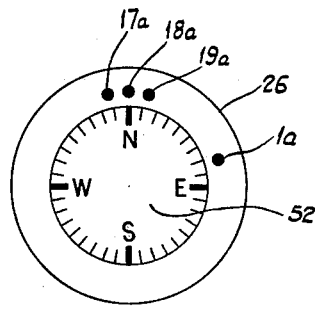
Fig. 3 is a representation of the screen of a cathode ray tube showing the manner in which the bearing indication is given.

While the following specification describes the preferred form of a direction indicating device, it is to be understood that the invention is directed as well to a navigational instrument for providing a "fix" giving the precise geographical location of the receiver. A direction indicating device indicates the bearing of a landmark of known location and so provides a "line of position" along which the location of the vehicle must lie. Two such lines of position provide at their intersection a "point of position" or "fix" precisely defining the location of the vehicle.

It is therefore only necessary to duplicate at a second location the transmitting apparatus described herein and to selectively operate the receiving apparatus in the manner described hereinafter so as to distinguish between the two sets of transmitting apparatus in order to obtain a precise "fix."

Briefly described, the direction indicating device of this invention comprises two sets of apparatus; first, a fixed transmitting apparatus situated at a known geographical location, and second a mobile receiving apparatus carried by the surface ship or aircraft. The transmitting apparatus comprises a means for establishing a unidirectional transmission comprising a narrow confined beam of radio frequency energy which is rotated at constant speed about a vertical axis, together with a means for radiating a non-directional short duration pulse each time the rotating beam occupies a predetermined orientation, as, for example, when pointing due north.

The receiving apparatus comprises a means for simultaneously receiving the directional and non-directional transmissions, together with a means for measuring the time lapse between the reception of the two types of transmitted signals. The indicating means may conveniently comprise a cathode ray tube which is so operated as to produce upon the indicating screen a normally circular trace about which the cathode spot is rotated in synchronism with the rotation of the rotating beam. The trace is modified by the reception of each of the signals so that the time lapse between the reception of the signals is directly presented on the cathode ray tube screen as an angular separation of the two trace modifications, the angular separation being equal to the bearing of the transmitting apparatus from the receiving apparatus.

Referring to the drawings, I have illustrated in Fig. 1 one form the transmitting apparatus may take. As is shown therein, the unidirectional transmission is obtained by a suitable directional antenna which may, as shown, comprise a suitable reflector 1, into which very high frequency radio energy is directed by means of an apertured wave guide 2. The wave guide 2 may be extended downwardly as shown at 3 to comprise a rotating shaft or support by means of which the reflector 1 may be rotated about a vertical axis. The radio frequency energy may be fed into the wave guide 3 from a wave guide 4 through a rotating joint 5 of conventional construction. A shaft 6 extending below the joint 5 and mechanically connected to the wave guide 3 may be connected to a drive means 7 comprising an electric motor for rotating the reflector 1.

The wave guide 4 is connected to draw power from a very high frequency continuous wave transmitter represented at 8. It will be seen that with the apparatus thus described, there will be transmitted a tight fan-like beam of radio frequency energy having a very narrow angular scope in the horizontal plane. This beam is rotated by the rotation of the reflector 1, preferably at a speed of the order of one revolution per second.

The transmitting apparatus preferably also includes an omnidirectional radiator 9 which is coupled, as indicated at 10, to the output of a pulse transmitter represented generally at 11. The pulse transmitter is adapted to be triggered by a trigger control unit 12 which is connected as shown at 13 to a control device indicated generally at 14, operating to initiate the trigger control 12 one or more times during each revolution of the reflector 1 and at predetermined orientations of the beam radiated from the reflector 1.

The control device 14 is diagrammatically illustrated as comprising a rotary switch including a rotatable switch arm 15 connected to the shaft of the motor 7 to be rotated in synchronism with the reflector 1. In its rotation the switch arm 15 traverses an insulating ring 16 in which may be placed three conductive segments 17, 18 and 19 to which the control conductors indicated generally at 13 may be connected. Preferably the centre contact 18 is so located on the ring 16 as to be engaged by the rotating contact 15 when the radio beam emanated from the reflector 1 is pointing due north. The contacts 17 and 19 are placed closely adjacent to the contact 18 but sufficiently separated therefrom to cause three separate and distinct pulses to be radiated from the non-directional antenna 9.

The mobile receiving apparatus is illustrated at Fig. 2 as comprising a receiving antenna 20 coupled as shown at 21 to a suitable receiver 22 tuned to the frequency of the transmissions from the reflector 1 and antenna 9, it being understood that these transmissions are made on substantially identical frequencies. The output of the receiver 22 is coupled as shown at 23 to a rectifier 24 operating to produce in an output circuit 25 a pulse signal whenever transmissions from the reflector 1 or the antenna 9 are picked up by the receiving antenna 20.

In Fig. 2 there is illustrated diagrammatically a cathode ray tube 26 of the electrostatic type. The tube 26 may be of known construction and include two sets of deflection plates 27a, 27b and 28a, 28b, accelerating and focussing anodes 29, 30 and 31, a control grid 32, a cathode 33, and means 34 for heating the cathode 33. The heater 34 is connected to a suitable source of electric energy (not shown) for heating the cathode to an electron emitting temperature.

The accelerating and focussing anodes 29—31 are connected in a conventional manner and as shown at 35 to a suitable source of positive operating potential (not shown).

The control grid 32 is preferably connected as shown at 36 through a resistance 37 to a suitable supply of negative bias potential (not shown).

The electron beam which by the normal operation of the tube 26 is caused to impinge upon the fluorescent screen thereof, is given a circular motion by applying to the deflection plates 27 and 28 a two-phase potential. This potential may be derived from any suitable source. However, for the purposes of illustration there has been diagrammatically represented in Fig. 2 a sine-cosine potentiometer 38 which may be of conventional construction and provide three output terminals 39, 40 and 41, and a pair of input terminals 42 across which a battery 43 or other source of direct potential is connected. The output terminals 39 and 41 may be connected by conductors 44 and 45 to the deflection plates 27a and 28a respectively. The corresponding deflection plates 27b and 28b are connected together and to output terminal 40 by means of a conductor 46.

With such a potentiometer, rotation of the shaft 47 thereof causes the potential between terminals 39 and 40 to vary in proportion to the sine of the angle through which the shaft 47 is rotated, while the potential between terminals 40 and 41 varies as the cosine of the shaft angle. There is thus applied to conductors 44, 45 and 46 a two-phase potential, the frequency of which is equal to the rotational frequency of the shaft 47.

With the arrangement thus described rotation of the shaft 47 will cause the indicating spot on the face of the cathode ray tube to be moved in a circle in synchronism with the rotation of the shaft 47. The shaft 47 is preferably connected through a gearbox 48 to an electric motor 49. The motor 49 may be connected as shown to a suitable source of electric power 50 through a rheostat 51 by means of which the speed of rotation of the motor 49 may be adjusted to cause the shaft 47 to be rotated at the same speed as the reflector 1 of the transmitting apparatus is rotated by the motor 7.

The output 25 of the rectifier 24 is preferably connected as shown through the conductor 36 to the control grid 32. The negative bias normally applied to the control grid 32 is preferably adjusted to block the cathode ray tube to normally prevent the appearance of a trace upon the screen of the tube. The amplitude of the pulse signal developed at the output 25 of the rectifier 24 is preferably adjusted to a value which will shift the potential of the grid 32 in a positive direction a sufficient amount to cause an indication to be given on the screen of the cathode ray tube. Four such controlling pulses will be applied to the grid 32 for each rotation of the electron beam. Three of these pulses are derived from the three pulses transmitted from antenna 9 at the time the contact 15 engages the three segments 17, 18 and 19, the fourth pulse generated by the sweeping of the directional beam past the antenna 20.

This operation of the cathode ray tube thus produces four spots upon the fluorescent screen of the cathode ray tube in the manner which is illustrated in Fig. 3, wherein the four spots have been identified by the reference characters 17a, 18a, 19a and 1a, the ordinals 17, 18 and 19 being used to indicate that the spots result from the engagement of the contact 15 with the segments 17, 18 and 19, and the ordinal 1 being employed to indicate that the spot results from the reception of the beam transmitted from the rotating antenna 1.

If, as described, the segment 18 is so located that the beam is pointing north at the time the movable arm 15 contacts the segment 18, it will be seen that the spot 18a is identified with the northerly direction of the rotating beam. This spot is distinguished on the face of the cathode ray tube from the spot 1a by virtue of being closely flanked on either side by the spots 17a and 19a.

Accordingly a compass card 52 rotatably mounted concentrically upon the face of the cathode ray tube may be turned as indicated in Fig. 3 to a position aligning the north index thereof with the spot 18a, whereupon the bearing of the transmitter from the receiver may be read directly from the compass card 52 opposite the indicating spot 1a.

As an alternative arrangement the compass card 52 may be immovably fixed to the face of the cathode ray tube and alignment of the spot 18a with the north index of the card established by slightly changing the speed of rotation of the motor 49, so that all four spots will slowly progress around the face of the cathode ray tube screen. When in so moving the spot 18a moves to coincidence with the north index of the compass card 52, the speed of the motor 49 may be adjusted in synchronism with the rotation of the reflector 1 to hold the spots in fixed position with respect to the compass card 52.

As each of the spots 17a, 18a, 19a and 1a, are each produced momentarily once each revolution of the reflector 1, which is preferably at the rate of about one revolution per second, in order to achieve a steady and continuous indication it is necessary to employ a cathode ray tube having a long persistence screen. A higher rate of rotation of the reflector 1 will, of course, permit the use of a cathode ray tube screen of correspondingly shorter persistence.

Figure 4:
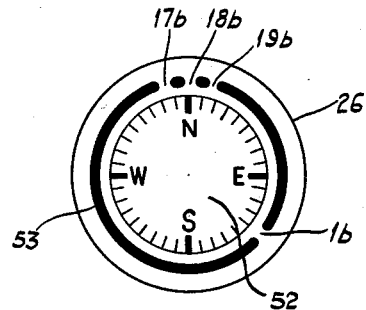
Fig. 4 is a view similar to Fig. 3 but illustrating differently appearing indication resulting from a different mode of operation of the receiving apparatus.

An alternative form of display such as is illustrated in Fig. 4 may be readily obtained by normally biasing the cathode ray tube grid 32 at such value as to normally produce on the face of the cathode ray tube 26 a continuous circular trace such as is shown at 53. By so connecting the rectifier 24 as to produce a negative pulse in the output circuit 25 upon the reception of the transmitted signals and adjusting the magnitude of these pulses to a value sufficient to block the operation of the cathode ray tube, the normal circular trace 53 may be interrupted at the four indicating points as is represented at 17b, 18b, 19b and 1b.

Figure 5:
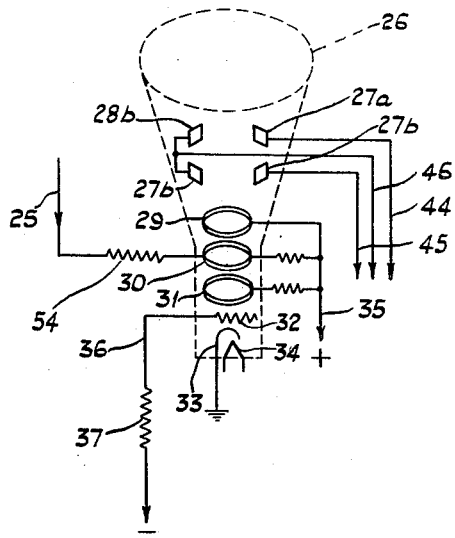
Fig. 5 is a diagram illustrating a modified mode of connecting the receiving apparatus to the cathode ray tube indicating device.
Figure 6:
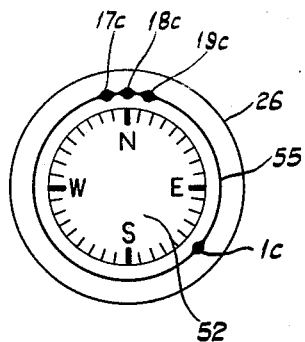
Fig. 6 is a view similar to Figs. 3 and 4 but illustrating still another form of presentation of the indicated bearing.

There is illustrated in Fig. 5 a modified form of connection of the rectifier output to the cathode ray tube 26 for producing an indication of the character illustrated in Fig. 6. In a circuit as shown in Fig. 5 the output 25 has been removed from the grid 32 and applied through a resistance 54 to the focussing anode 30. The potentials normally applied to the tube electrodes are adjusted to produce upon the screen of the cathode ray tube a sharply defined circular trace 55 as shown in Fig. 6. The pulses which are applied to the focussing anode 30 serve to de-focus the electron beam and produce indicating spots such as are represented in Fig. 6 by the reference characters 17c, 18c, 19c and 1c.

It will be understood from the foregoing that during the operation of the system the speed of the motor 49 is adjusted to synchronise the rotation of the electron beam with the rotation of the reflector 1, so that the indicating spots remain stationary upon the cathode ray tube screen.

If the device is to be used as a navigational aid for obtaining a point of position, the transmitting equipment shown in Fig. 1 may be duplicated at a second location and may, if desired, be operated at a somewhat different frequency. A wave change switch incorporated in the receiver 22 may be employed to select which of the two sets of transmitting apparatus are received, so that by changing from one to the other, substantially simultaneous bearings may be taken on the two known transmitting locations.

Alternatively, both sets of transmitting apparatus may be operated at the same frequency so that signals from both transmitters will be received simultaneously. In this case the two transmitting antennae 1 are rotated at different rates of speed. Thus by adjusting the speed of the motor 49 to be in synchronism with the beam rotational speed of one transmitter, the spots produced by the reception of those signals will remain stationary, while the spots produced by the reception of the signals from the other transmitter will rotate about the face of the screen at a rate equal to the difference between the rates of rotation of the two directional antennae. Knowing which of the two transmitting locations is identified with the higher of the two beam rotational speeds, identification of the received signals is readily achieved.

While the use of a cathode ray tube of the electrostatic type has been described, it will be apparent to those skilled in this art that an electromagnetically deflected tube may also be used. Furthermore, with the exterior deflecting elements, the normally circular trace may be obtained by operating the deflection elements at a direct potential and physically rotating the elements relative to the tube.

From the foregoing it will be observed that the invention described herein provides for directly and continuously indicating in a vehicle such as a surface ship or aircraft, the bearing of one or more transmitters of known location so that the driver of the vehicle may determine either his line of position or point of position depending upon whether one or more than one set of transmitting apparatus is employed.

Attention is directed to the fact that the equipment is simple both in construction and operation and particularly that the receiving apparatus is of such a simple nature that it may be furnished at low cost and built within the rigid weight requirements specified by air borne apparatus.

While there has been shown and described the preferred embodiment of this invention, the same is not to be limited to the details of construction described herein except as defined in the appended claims.

I claim:

1. In a radio direction indicating apparatus, the combination of: unidirectional transmitting means for producing a concentrated beam of radio frequency energy of small angular scope in a horizontal plane; means for rotating said beam at substantially constant speed about an upright axis; an omnidirectional radiating means; means for radiating from said omnidirectional means a short duration pulse of radio frequency energy coincidentally with the arrival of said beam at a predetermined orientation; and means for radiating from said omnidirectional means another pulse immediately adjacent in time to said first mentioned pulse to thereby identify and distinguish said pulses from said beam.

2. In a radio direction indicating apparatus, the combination of: unidirectional transmitting means for producing a concentrated beam of radio frequency energy of small angular scope in a horizontal plane; means for rotating said beam at substantially constant speed about an upright axis; an omnidirectional radiating means; means for radiating from said omnidirectional means a short duration pulse of radio frequency energy coincidentally with the arrival of said beam at a predetermined orientation; mobile receiving means for receiving said radio frequency energies; means at said receiver for indicating the angle through which said beam is rotated during the time lapse between the reception of said pulse and the reception of said beam; and means for identifying said pulse to distinguish the reception of said pulse from the reception of said beam.

3. In a radio direction indicating apparatus, the combination of: unidirectional transmitting means for producing a concentrated beam of radio frequency energy of small angular scope in a horizontal plane; means for rotating said beam at substantially constant speed about an upright axis; an omnidirectional radiating means; means for radiating from said omnidirectional means a short duration pulse of radio frequency energy coincidentally with the arrival of said beam at a predetermined orientation; mobile receiving means for receiving said radio frequency energies; means at said receiver for indicating the angle through which said beam is rotated during the time lapse between the reception of said pulse and the reception of said beam; and means for radiating from said omnidirectional means another pulse immediately adjacent in time to said first mentioned pulse to thereby identify and distinguish at said receiving means the reception of said pulses from the reception of said beam.

WILLIAM J. O'BRIEN.

REFERENCES CITED

The following references are of record in the file of this patent:

UNITED STATES PATENTS

| Number | Name | Date |
| --- | --- | --- |
| 1,135,604 | Meissner | Apr. 13, 1915 |
| 1,988,006 | Greig | Jan. 15, 1935 |
| 2,208,376 | Luck | July 16, 1940 |
| 2,368,318 | Muller | Jan. 30, 1945 |
| 2,409,456 | Tolson et al. | Oct. 15, 1946 |
| 2,423,523 | Shmurak | July 8, 1947 |

FOREIGN PATENTS

| Number | Country | Date |
| --- | --- | --- |
| 317,826 | Great Britain | May 29, 1930 |